HYDRAULIC PIPE SNUBBER FOR OIL WELLS

Original Filed Dec. 9, 1960 5 Sheets-Sheet 1

CICERO C. BROWN
INVENTOR.

BY

ATTORNEY

HYDRAULIC PIPE SNUBBER FOR OIL WELLS

Original Filed Dec. 9, 1960 5 Sheets-Sheet 2

CICERO C. BROWN
INVENTOR.

BY

ATTORNEY

Nov. 10, 1964 C. C. BROWN Re. 25,680

HYDRAULIC PIPE SNUBBER FOR OIL WELLS

Original Filed Dec. 9, 1960 5 Sheets-Sheet 3

CICERO C. BROWN
INVENTOR.

BY

ATTORNEY

HYDRAULIC PIPE SNUBBER FOR OIL WELLS

Original Filed Dec. 9, 1960 5 Sheets-Sheet 4

CICERO C. BROWN
INVENTOR.

BY

ATTORNEY

HYDRAULIC PIPE SNUBBER FOR OIL WELLS

Original Filed Dec. 9, 1960 5 Sheets-Sheet 5

CICERO C. BROWN
INVENTOR.

BY

ATTORNEY

United States Patent Office

Re. 25,680
Reissued Nov. 10, 1964

25,680

HYDRAULIC PIPE SNUBBER FOR OIL WELLS

Cicero C. Brown, Houston, Tex., assignor to Brown Oil Tools, Inc., Houston, Tex., a corporation of Texas Original No. 3,096,075, dated July 2, 1963, Ser. No. 74,977, Dec. 9, 1960. Application for reissue Aug. 2, 1963, Ser. No. 300,143
9 Claims. (Cl. 254—29)

Matter enclosed in heavy brackets [ ] appears in the original patent but forms no part of this reissue specification; matter printed in italics indicates the additions made by reissue.

This invention relates to a snubbing device for inserting and removing strings of pipe, particularly tubing, to and from oil wells, and more particularly to a hydraulically actuated device for this purpose.

Frequently in the operation of oil and gas wells, it becomes necessary to insert or remove strings of pipe, particularly tubing, while the well is under high fluid pressures. Under such conditions devices have been employed for forcing the tubing through suitable stuffing boxes, such as are formed by blowout preventers and the like, to maintain control of the pipe string as it is being run into or out of the bore of the well. Such devices are commonly referred to in the industry as "snubbers."

Snubbers heretofore employed are generally relatively large, cumbersome and complicated structures which present difficulties in installing and manipulating, and are subject to numerous difficulties in operation.

When snubbing pipe into a well bore, often the pipe will encounter obstructions, such as bridges of rock or detritus, or the like, which make it very difficult to move the pipe into the well bore. Present designs of equipment do not lend themselves readily to meeting this difficulty and this has presented a problem in the running of pipe strings into well bores, particularly those which are under high fluid pressures.

It is a primary object of this invention to provide a pipe snubbing device which is of relatively simple construction, which is self-supporting when attached to a well head fitting, and which is generally compact and easily operated.

Another important object is the provision of a pipe snubbing device in which the pipe-gripping elements are fully hydraulically actuated.

Still another important object provides a pipe snubbing device of the character described, which includes means for rotating the pipe string as it is being moved into or out of a well bore.

A further object is to provide a device of the character described in which the snubbing elements may be employed for hydraulic pressure testing of the pipe-gripping elements during use to determine that their gripping qualities remain unimpaired. This is very important from a safety standpoint.

Still other and more specific objects and advantages of this invention will become more readily apparent from the following detailed description when read in conjunction with the accompanying drawing which illustrates one useful embodiment in accordance with this invention.

Referring to the drawing.

Figure 1:
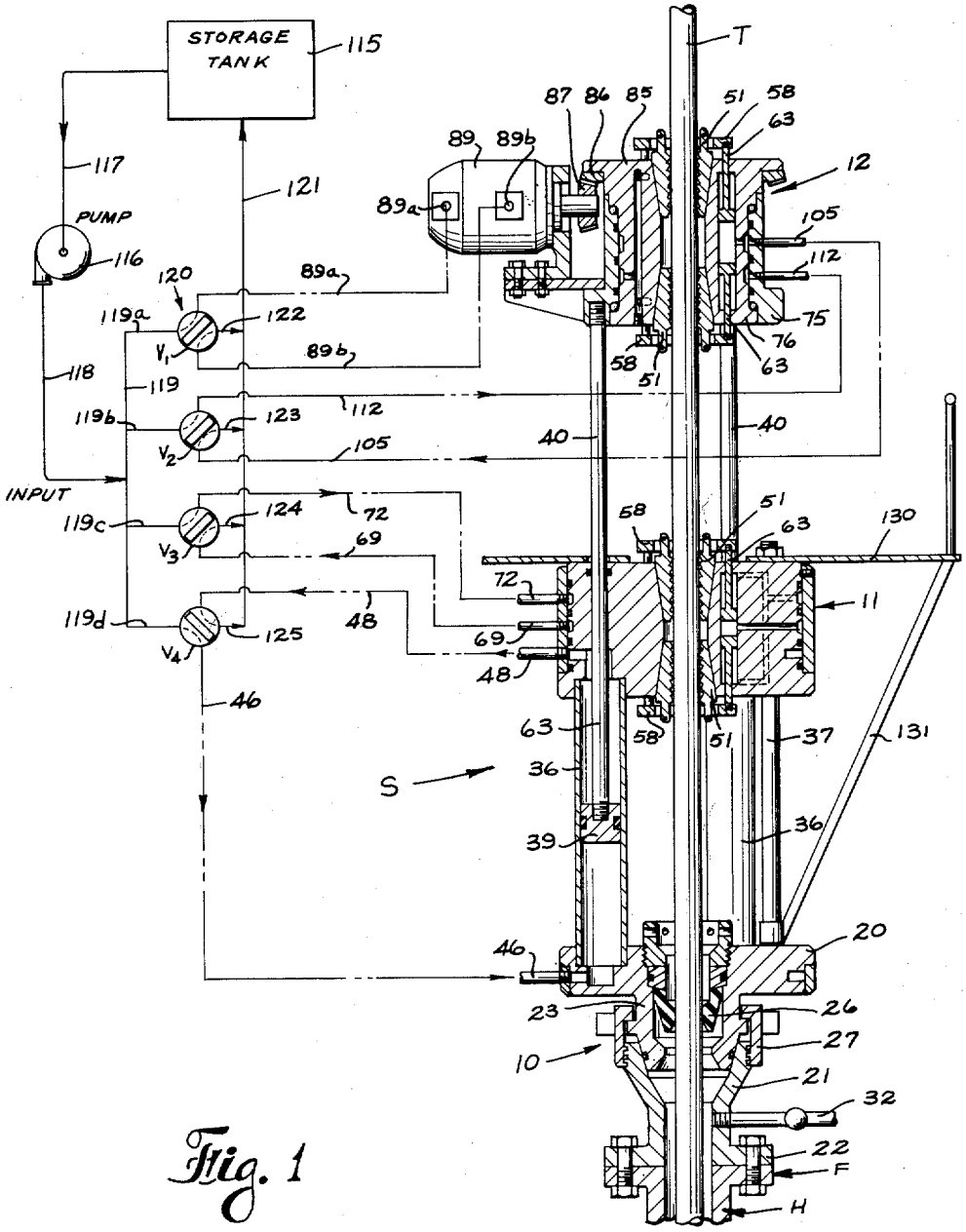
FIG. 1 is a longitudinal sectional view, partially schematic, illustrating the device mounted on a well head and showing the parts thereof at one stage in the operation of the device.

Referring to the several figures of the drawing, the snubbing device is shown mounted on top of a well head, designated generally by the letter H, which is of any generally conventional construction. As illustrated, the well will usually include one or more conventional blowout preventers P (FIG. 2) which will be secured in a conventional manner to the upper end of the well head, the upper end of the blowout preventer terminating at a fitting F, of conventional flanged form. A snubbing device in accordance with this invention, designated generally by the letter S, is mounted directly on fitting F and comprises a base member, designated generally by the numeral 10, which is adapted to be secured to fitting F, a lower snubbing member, designated generally by the numeral 11, which is fixedly secured in vertically spaced relation on base member 10, and an upper snubbing member, designated generally by the numeral 12, which is positioned above lower snubbing member 11 and is vertically movable relative thereto.

Base member 10 includes a horizontally disposed annular base plate 20 which is mounted on a mounting nipple 21 provided at its lower end with a flange 22 by which the mounting nipple may be secured in the conventional manner to the flanged upper end of fitting F. Base plate 20 has a downwardly extending neck 23 having an axial bore 24. The exterior of the lower end of neck 23 has a downwardly and inwardly tapered portion at 23a to seat in a correspondingly tapered seat 25 in the upper end of the mounting nipple. Seal rings 25a are mounted in tapered portion 25a to seal with seat 25. A tubular stripper seal 26 is mounted in bore 24 and is adapted to form a distensible seal between the latter and a pipe string T (FIGS. 1, 2 and 3) being moved through the stripper seal. The latter may be of any conventional construction commonly designed for effecting such a seal. Stripper seals of this general character are illustrated in my co-pending application Serial No. 708,170, now Patent No. 3,006,413. Another type is shown in my U.S. Patent 2,762,638.

Figure 6:
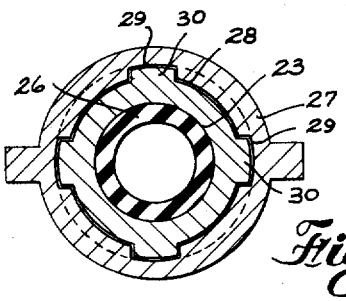
FIG. 6 is a cross-sectional view taken along line 6—6 of FIG. 4.

Base plate 20 is releasably secured to mounting nipple 21 by means of a lock ring 27 which is screwed on to the upper end of nipple 21 and is provided with a plurality of circumferentially spaced lugs 28 (FIG. 6) in the bore thereof which are separated by the spaces 29. Neck 23 of the mounting plate is provided with radially extending lugs 30 which are adapted to pass through the spaces 29 and in response to partial rotation, such as a quarter-rotation of nut 27, will be locked beneath lugs 28 forming a bayonet-type coupling. To further tightly secure the base plate to the mounting nipple, lock ring 27 can be screwed down on threads 31 provided about the upper end of mounting nipple 21, and thereby clamp the mounting plate and its attached seal unit tightly in place on the mounting nipple. The latter is provided with a valved vent nipple 32 through the wall thereof for venting any pressure fluid trapped below seal unit 26 when a pipe is passing therethrough.

Lower snubbing member 11 includes a generally cylindrical body 35 which is spaced from base plate 20 by three cylinders 36, having axial bores 36a, disposed 120° apart adjacent the periphery of body 35 and having their upper and lower ends seated in sockets 35a and 20a, respectively, in body 35 and plate 20, the ends of the cylinders abutting the bottoms of the respective sockets. Elongate stud bolts 37 extend longitudinally from base plate 20 through body 35 and have their upper ends threaded to receive nuts 38 by means of which body 35 may be urged downwardly toward plate 20 clamping the ends of the several cylinders between the bottoms of their respective sockets and completing the rigid connection between lower snubbing member 11 and base plate 20. A sealed piston 39 is slidably mounted in each of the cylinders 36 and each piston is secured to a piston rod 40 which extends vertically through a passage 41 in body 35. The upper ends of passages 41 are counterbored to form stuffing boxes 42 for receiving rod packing 43 and a threaded gland ring 44 by means of which fluid-tight seals are provided about piston rods 40. The bottoms of sockets 20a and 35a are counterbored to provide recesses 20b and 35b, respectively. The several recesses 20b communicate with an annular channel 45 provided near the periphery of base plate 20, and a pressure fluid conduit 46 communicates through a suitable opening in the wall of plate 20 with the interior of channel 45. A similar annular channel 47 communicates with the several recesses 35b and is similarly in communication with a pressure fluid conduit 48.

Figure 8:
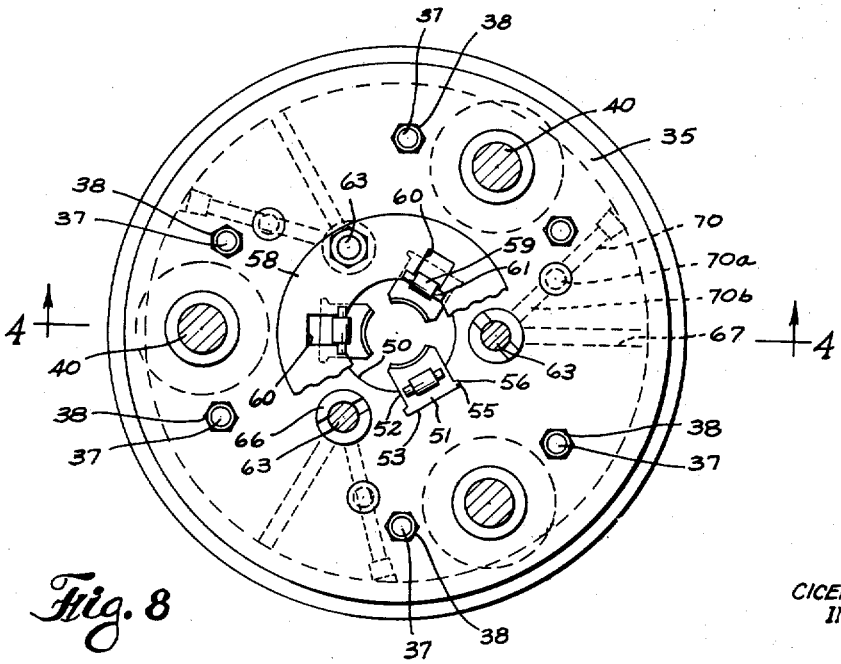
FIG. 8 is a top plan view taken along line 8—8 of FIG. 4.

Body 35 has a through bore 50 which is coaxial with the bores of the base plate 20, neck 23, mounting nipple 21, fitting F and well head H, to accommodate pipe to be moved into and out of the well. The upper and lower end portions of bore 50 define oppositely tapering slip bowls adapted to receive upper and lower sets of circumferentially spaced pipe-gripping slips 51. The latter are wedge-shaped in longitudinal section and are identical in shape and construction, being adapted when longitudinally advanced into the respective ends of bores 50 to move radially inwardly into pipe-gripping position and when longitudinally retracted to move radially out of pipe-gripping position. The slips are individually guided in their longitudinal and radial movements by being mounted in guide slots 52, generally complementary in cross-section to the slips, and having bottom walls 53 which slope inwardly toward the center portion of bore 50 from the outer ends thereof. The slope of bottom walls 53 cooperates with the taper of the back faces of the slips to produce the radial movement of the slips in response to their longitudinal movements. The inner faces of the slips are provided with pipe-gripping wickers or teeth, preferably buttress teeth 54, the teeth on the upper set of slips facing upwardly and those on the lower set of slips facing downwardly. To prevent the slips from being dislodged from slots 52, the back edges of the slips are provided with laterally projecting flanges 55 which are slidably received in correspondingly shaped grooves 56 (FIG. 8) in the side walls of the slots 52.

The outer ends of each of the slips are supported in a hanger ring 58 by means of which the sets of slips may be raised and lowered in their respective slip bowls. The connections formed between the slips and the hanger rings comprise hanger arms 59 integrally formed with the slips to extend from the outer end of each of the slips and to project through guide slots 60 in the hanger rings. Hanger arms 59 may be of the generally rectangular shape illustrated and guide slots 60 are of substantially the same width but longer radially than the thickness of arms 59. Thus, the slips are free to move radially as they are raised and lowered by the hanger rings. The upper end of each of the arms 59 which projects through its slot 60 is provided with laterally extending cylindrical ears 61 which slidably engage the outer face of the hanger ring to permit the radial movement of the slips while preventing the slips from falling through the slots. The arms being smaller in width and thickness than the outer ends of the respective slips, the outer ends of the latter form shoulders 62 which limit movement of the slips through the slots 60 in the outward direction. Each of the hanger rings 58 is connected to a plurality (three in the illustrative embodiment) of angularly spaced, vertically disposed piston rods 63 which extend into the opposite ends of a vertically arranged cylinder 64 provided in body 35. The inner ends of the piston rods 63 carry sealed pistons 65, by the reciprocation of which rods 63 will be caused to raise and lower the respective hanger rings and the slips secured thereto. Each of the piston rods is reciprocable through a packing gland 66 screwed into the upper and lower ends of cylinder 64. Pressure fluid is supplied to cylinders 64 at points between the pistons 65 by means of radial passages 67 which communicate with a common annular channel 68 formed near the periphery of body 35. A pressure fluid conduit 69 communicates with channel 68 through a suitable opening in the wall of body 35. Passageways 70, 70a and 70b of suitable form are provided in body 35 for communication with the outer ends of cylinder 64 inside packing gland 66. Passages 70, 70a and 70b communicate with a common supply channel 71 formed near the periphery of body 35. A pressure fluid conduit 72 communicates with channel 71 through a suitable opening in the wall of body 35.

It will be seen that when it is desired to retract or move the sets of slips outwardly with respect to the related slip bowls, pressure fluid may be admitted by way of conduit 69 into channel 68 and thence via passages 67 into the respective cylinders 64 between their respective pistons 65. Pressure fluid contained in the portions of cylinders 64 between the pistons and the respective packing glands will at the same time be displaced through passages 70, channel 71 and conduit 72. To effect inward movement or advancement of the slips, the flow of pressure fluid will be reversed; that is, pressure fluid will be supplied through conduit 72 to channel 71 and thence by way of the several passages 70, 70a and 70b to the outer end portions of cylinder 64, thereby moving pistons 65 and their piston rods 63 inwardly. Fluid in the cylinders between pistons 65 will then be discharged through passages 67, channel 68 and conduit 69. Similarly, pistons 39 and their attached piston rods 40 may be raised by introducing pressure fluid into cylinders 36 beneath pistons 39 through conduit 46, channel 45 and recesses 20b, any fluid above the pistons being simultaneously discharged through recesses 35b, channel 47 and conduit 48. The reverse flow of pressure fluid into conduit 48 and out of conduit 46 will effect downward movement of pistons 39 and the attached piston rods 40.

Figure 5:
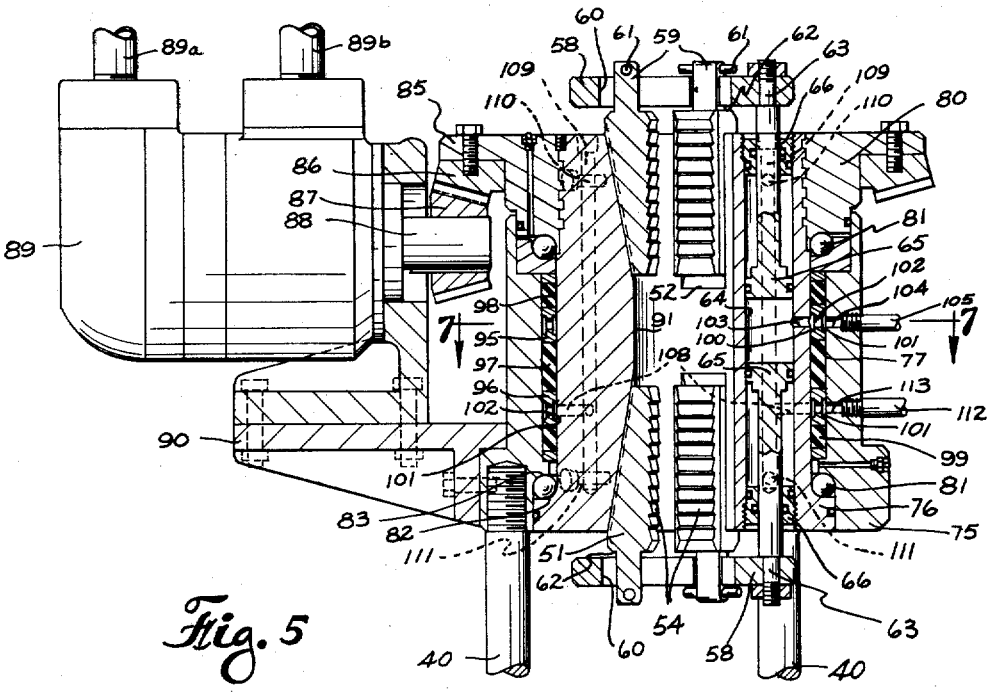
FIG. 5 is a longitudinal sectional view of the upper snubbing element of the device.

Moving now to the upper snubbing member 12, as best seen in FIG. 5, this member comprises two main portions, an outer sleeve member 75 and an inner bushing 76. The external diameter of bushing 76 is made somewhat smaller than the internal diameter of sleeve 75 to provide the annular space 77 therebetween. A drive ring 80 is threadedly secured to the upper end of bushing 76 and roller bearings 81 are provided between the lower end of drive ring 80 and the upper end of sleeve member 75, and a similar roller bearing 81 is provided between opposing shoulder 82 and 83 on bushing 76 and sleeve member 75, respectively, whereby to provide for a rotatable connection for bushing 76 with respect to sleeve member 75. The upper ends of piston rods 40 are screwed into the lower end of sleeve member 75 whereby upper snubbing member 12 will be raised and lowered in response to the reciprocation of piston rods 40. Drive ring 80 has a radially extending annular flange 85 to the lower face of which is bolted a ring gear 86, which is in mesh with a pinion 87 mounted on the drive shaft 88 of a fluid-driven motor 89 which is mounted on a bracket 90 suitably secured at one side to sleeve member 75. By means of motor 89, it will be seen that bushing 76 may be rotated relative to sleeve member 75 as may be desired in the course of operation of the device, as will be described subsequently. Motor 89 is provided with connections for pressure fluid conduits 89a and 89b by means of which pressure fluid may be reversely circulated through motor 89.

Figure 7:
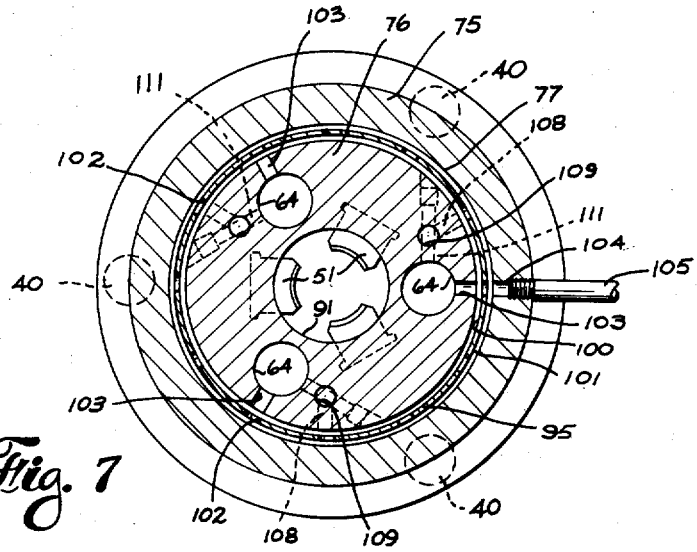
FIG. 7 is a cross-sectional view taken generally along line 7—7 of FIG. 5.

Bushing 76 has a through bore 91 coaxial with bore 50 of the lower snubbing member, and the upper and lower ends of bore 91 define slip bowls for the reception of slips 51, which are identical in form and construction with those mounted in the lower snubbing member, as previously described. As in the case of the lower snubbing member, slips 51 are supported in hanger rings 58 which are, in turn, raised and lowered by means of the piston rods 63 secured to pistons 65 mounted in cylinders 64, the cylinders being located in bushing 76. By reason of the two-part construction of upper snubbing member 12, some modification of the form of the pressure fluid supply channels to cylinders 64 is made necessary to provide fluid communication between cylinder 64 and an external pressure fluid source. Two annular metal inserts 95 and 96 (FIGS. 5 and 7) are installed in space 77 between sleeve member 75 and bushing 76. These inserts are vertically spaced and separated from each other by means of packing 97. Additional packings 98 and 99 close off the portions of space 77 above and below the respective inserts 95 and 96. Insert 95 is provided on its inner and outer faces with annular grooves 100 and 101, respectively, and is pierced at points opposite the respective cylinders 64 with radial openings 102. A radial passage 103 in bushing 76 communicates with each of the cylinders 64 at a point between the pistons 65 and connect to space 77 at points communicating with groove 100. Supply passage 104 extends radially through the wall of sleeve member 75 into communication with space 77 and thence with groove 101. A fluid supply conduit 105 connects with passage 104. With this arrangement it will be seen that pressure fluid introduced through conduit 105 will flow through passage 104 and into groove 101, which, of course, encircles bushing 76. The pressure fluid will then flow through openings 102, groove 100 and radial passages 103 to the respective cylinders 64. Insert 96 (see also FIG. 7) also has inner and outer peripheral grooves 100 and 101 and radial openings 102. The latter communicate, by way of radial passages 108 in bushing 76 with vertical passages 109 which open at their upper and lower ends through radial passages 110 and 111, respectively, into the upper and lower ends of cylinders 64. A pressure fluid supply conduit 112 communicates through a radial passage 113 with outer groove 101 of lower insert 96, whereby pressure fluid may flow from conduit 112 through passages 113, 102, 108, and 109 to passages 110 and 111, and thence into the outer end portions of cylinders 64. Thus, pressure fluid flow may be introduced by conduit 105 between the pistons 65 to move the slips outwardly, pressure fluid in the outer portions of the cylinders being discharged through conduit 112, or reversing the flow through conduit 112 into the outer portions of the cylinders will effect advancement or inward movement of the slips, the fluid trapped between pistons 65 being [discharge] *discharged* in this instance through conduit 105.

In FIG. 1, a system is diagrammatically illustrated by which pressure fluid may be supplied to actuate the various elements of the snubbing device. This system includes a storage tank 115 for hydraulic pressure fluid from which a pump 116 draws fluid through a suction conduit 117 and discharges the fluid under pressure through a pipe 118 to a pipe header 119 and valve manifold 120 from which a return pipe 121 leads to tank 115.

Pipe header 119 is connected to a plurality of branch pipes 119a, 119b, 119c and 119d which connect to inlets of multi-port valves $V_1$, $V_2$, $V_3$, and $V_4$, respectively, which are suitably arranged in manifold 120. Valve $V_1$ has ports connected with conduits 89a and 89b for supplying pressure fluid to motor 89. A branch pipe 122 connects still another port in valve $V_1$ to pressure fluid return pipe 121.

Valve $V_2$ has ports connected with fluid conduits 105 and 112 for supplying pressure fluid to upper snubbing member 12 and with a branch pipe 123 which connect to pressure fluid return pipe 121.

Valve $V_3$ has ports connected with fluid conduits 69 and 72 for supplying pressure fluid to lower snubbing member 11 and with a branch pipe 124 which connects to pressure fluid return pipe 121.

Valve $V_4$ has ports connected with fluid conduits 46 and 48 by which pressure fluid is supplied to cylinders 36 and with a branch pipe 125 which connects to pressure fluid return pipe 121.

It will be understood that the several valves $V_1$, $V_2$, $V_3$, and $V_4$ are of generally conventional multi-port construction by means of which pressure fluid entering through the respective header branch pipes 119a, 119b, 119c and 119d may be directed into any of the several conduits and branch pipes connected to the respective valves for circulation to and from the respective snubbing actuating devices, as will be described hereinafter.

Header 119, manifold 120, and the controls for the several multi-port valves will ordinarily be grouped in a suitable console located a short distance to one side of the well head where the operator may observe and control all operations of the snubbing device. The storage tank and pump will ordinarily be grouped on a skid or truck-mounted base for easy transport and positioned remotely from the well head. The pressure fluid conduits leading from the manifold to the several parts of the snubbing device will usually be flexible hoses with conventional quick coupling devices for rapid connection and disconnection.

The upper sets of slips 51 in the upper and lower snubbing members are arranged to prevent downward movement of the pipe relative to the snubbing members when the slips are in the advanced or inward positions. The lower sets of slips in both the snubbing members are arranged to prevent upward movement of the pipe relative to the snubbing members when these lower slips are in the advanced or inward positions. Both sets of slips in each snubbing member are usually actuated at the same time, i.e., all of the slips in each snubbing member are either engaged or disengaged at the same time. Usually the sets of slips in the upper snubbing member are disengaged from the pipe when those in the lower snubbing member are in the pipe-engaging position and vice versa.

Figure 2:
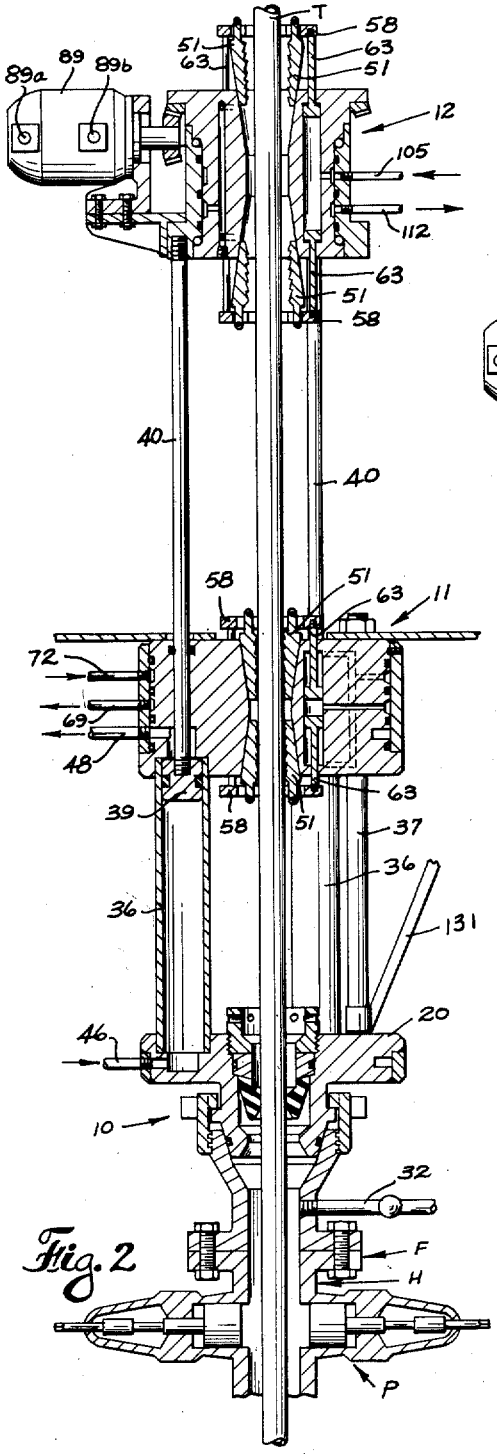
FIGS. 2 and 3 are views similar to FIG. 1, showing the parts at different stages in the operation.
Figure 3:
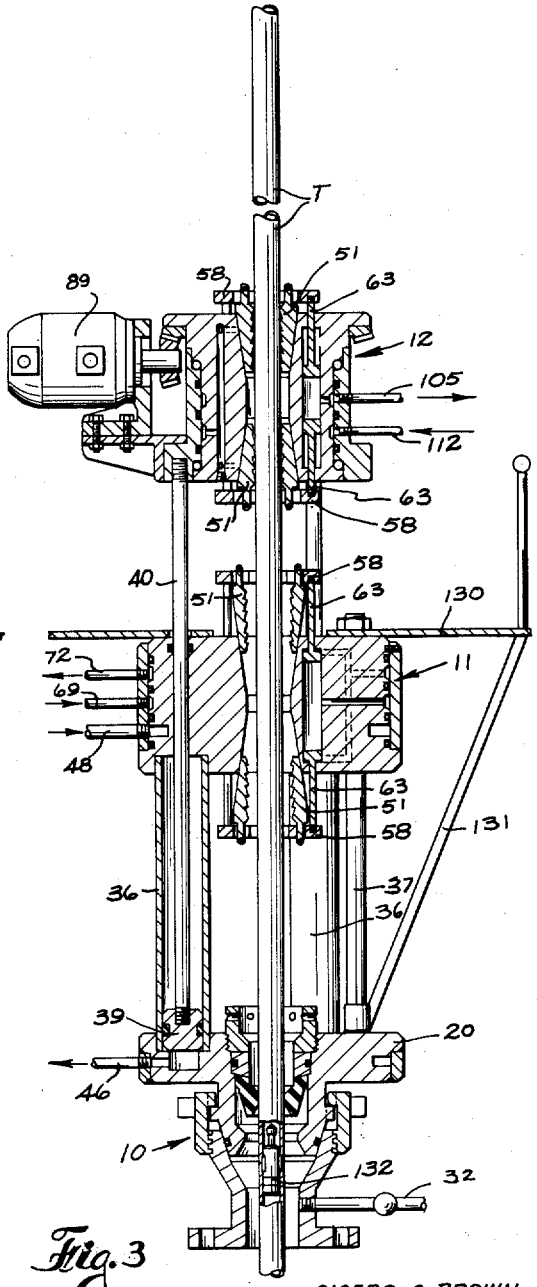
Figure 4:
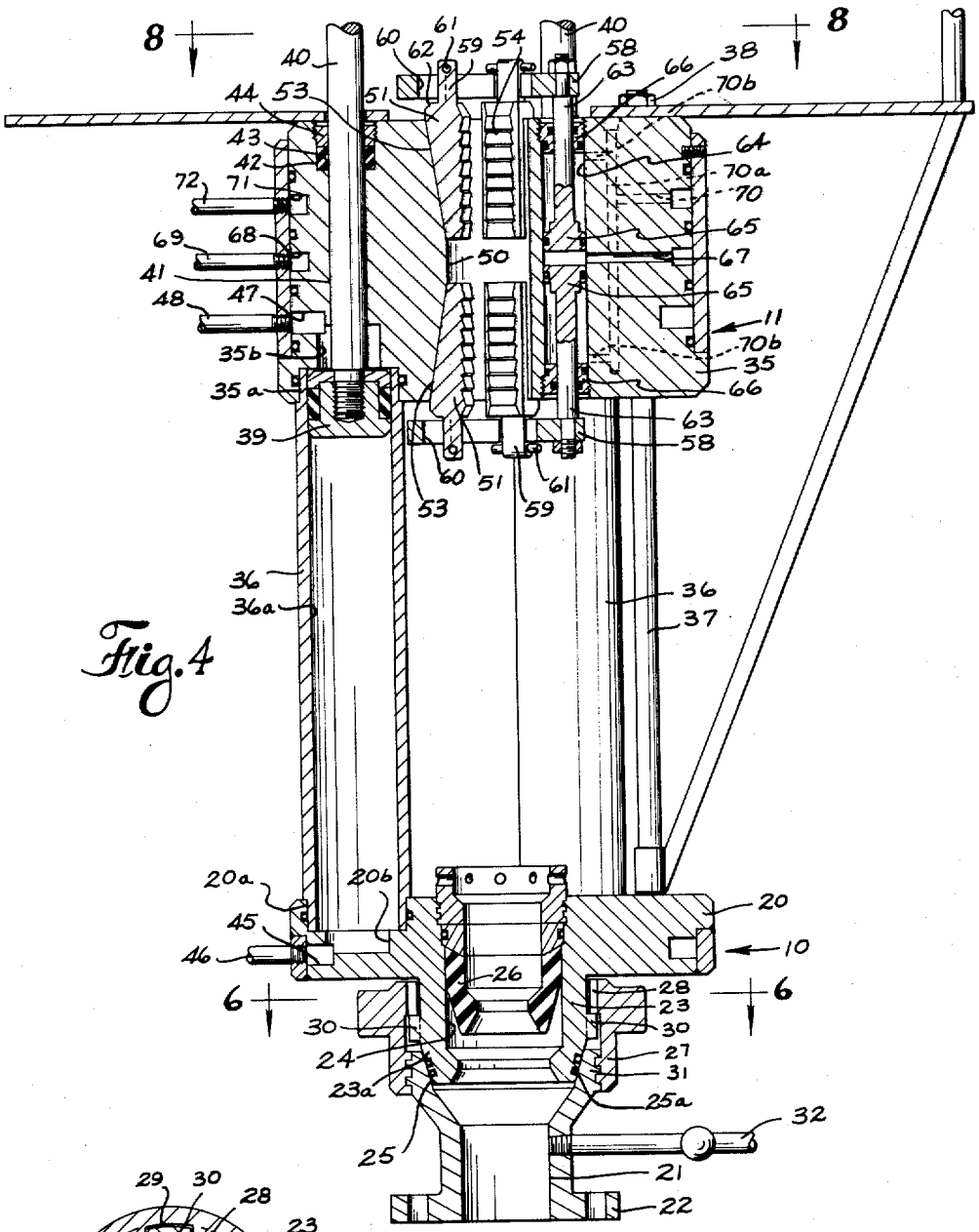
FIG. 4 is an enlarged vertical sectional view of the lower portion of the device, including the lower snubbing element, taken generally along line 4—4 of FIG. 8.

Operation of the device is as follows: Referring first to FIG. 2, it will be seen that pipe string T, closed by a suitable plug 132 (FIG. 3), is gripped by the slips in lower snubbing member 11, while the upper snubbing member 12 has been elevated to its maximum height, the slips in upper snubbing member 12 being in their retracted and disengaged positions. At this stage of operations, fluid pressure will be entering through conduit 46 into the lower ends of cylinders 36. This fluid pressure will have elevated pistons 39 to their maximum height, thereby placing upper snubbing member 12 in its uppermost position. Fluid pressure will also be directed through conduit 72 and thence through passages 70, 70a and 70b to the cylinders 64 forcing the slips into their advanced pipe-engaging positions, thereby gripping the pipe against both upward and downward movement relative to lower snubbing member 11. Return pressure fluid will flow through conduit 69 and valve $V_3$ to the storage tank. Fluid discharging from the upper ends of cylinders 36 will likewise be returned to the storage tank through conduit 48 and valve $V_4$. In order now to move pipe T downwardly into the well, fluid pressure will be directed through valve $V_2$ to conduit 112 forcing the slips in the upper snubbing member to their inward pipe-gripping position, as best seen in FIG. 3. As soon as these slips are engaged, the slips in the lower snubbing member will be released by reversing the flow of pressure fluid so as to direct pressure fluid through conduit 69 to urge piston 63 outwardly, thereby retracting the slips in lower snubbing member 11. As soon as the latter slips are released, valve $V_4$ will be shifted to the position to direct the flow of pressure fluid into conduit 48 and thence into the upper ends of cylinders 36 driving pistons 39 downwardly and thereby forceably pulling *the* upper snubbing member downwardly, this movement acting through the two sets of slips in the upper snubbing member to pull pipe T downwardly until upper snubbing member 12 has descended to the full extent permitted by the downward movement of pistons 39. To return the upper snubbing member 12 to its upper position preparatory to snubbing an additional length of pipe into the well, the flow of pressure fluid in lower snubbing member 12 will be reversed by suitable shifting of valve $V_3$ in order to advance the two sets of slips in the lower snubbing member to the positions illustrated in FIG. 2, to thereby secure the pipe string in the lower snubbing member. Thereupon, the flow of pressure fluid to the upper snubbing member is reversed to retract the slips in the upper snubbing member to the positions shown in FIG. 2. Valve $V_4$ is then shifted to the position which will direct pressure fluid through conduit 46 into the lower ends of cylinders 36 beneath pistons 39, whereby to elevate upper snubbing member 12 to its upper position preparatory for the next snubbing action. Thereupon, the cycle previously described is repeated until all of the pipe which it is desired to insert into the well will have been so introduced.

To withdraw a pipe string from the well, the operations previously described will simply be reversed. For example, as seen in FIG. 3 where upper snubbing member *12* is at the bottom of its stroke, fluid pressure will be directed into the lower ends of cylinders 36 beneath pistons 39 to elevate upper snubbing member 12 which, by reason of its engagement with the pipe, will pull the pipe upwardly from the well for a length corresponding to the stroke of pistons 39. The slips in the lower snubbing member will then be re-engaged, those in the upper snubbing member released, and pistons 39 driven downwardly to move the upper snubbing head down to the position shown in FIG. 3. Thereupon the slips in upper snubbing member *12* are re-engaged, those in the lower snubbing member *11* released and pistons 39 raised to thereby pull another length of pipe upwardly.

Thus, by suitable manipulation of valves $V_2$, $V_3$, and $V_4$, pipe strings may be effectively inserted into and removed from the well while under high pressure and with complete safety. Stripper seal 26 will maintain a fluid-tight seal about the pipe string to confine the pressure of any well fluid in the well.

When snubbing the pipe into or out of the well, conditions encountered may make it desirable to contemporaneously rotate the pipe string. This may be accomplished while the slips in the upper snubbing member are engaged with the pipe and those in the lower snubbing member are released from the pipe, by delivering pressure fluid to motor 89 through valve $V_1$ so as to operate the motor to drive through pinion 87 and ring gear 86 and effect rotation of bushing 76 relative to sleeve 75. Since the slips are mounted in slots 52 in bushing 76, they are held against rotation relative to the bushing and are in engagement with the pipe. Consequently, rotation of the bushing will act through the slips to rotate the pipe, thus allowing the pipe to cut its way through any obstructions which may be present in the well bore. In some cases, mere rotation of the pipe string without use of a bit or the like will aid in moving the pipe into and out of the well bore by the snubbing operation. This is a particularly advantageous feature of the present structure in that obstructions such as wall projections, bends in the well bore, bridges, or the like, may be encountered in the well bore which makes it very difficult to force the pipe into the well under direct longitudinal force. By providing the rotary drive for the pipe string, the latter, which may be initially equipped with some conventional type of cutting head at its lower end, can be caused to cut away the obstruction while the pipe is being forced downwardly into the well bore under the downward pull applied to the upper snubbing member.

In the course of operation of a device of the character described, dulling of the slip teeth may occur after a period of use and this could, unless detected, cause dangerous conditions to arise, by reason of slippage during continuing operation of the snubbing device. The structure, in accordance with the present invention, provides means for conducting frequent tests of the holding ability of the slips. FIG. 1 illustrates a position of the parts during such a test operation. Initially, the pressure fluid is directed into cylinders 36 to position pistons 39 at an intermediate point in the cylinders, a so-called "holding" position. The slips in both the upper and lower snubbing members will be actuated to engage the pipe. Thus, with both sets of slips in each of the snubbing members gripping the pipe, fluid pressure will be applied through conduit 46 to the lower ends of cylinders 36 to thereby apply upward pressure to the upper snubbing member. This will have the effect of applying upward force against the upper set of slips in upper snubbing member 12 and against the lower set of slips in lower snubbing member 11. If no movement occurs, it will be obvious that these sets of slips are holding effectively, thereupon the flow of pressure fluid to cylinders 36 will be reversed and pressure fluid introduced into the upper ends of cylinders 36 which will tend to force upper snubber member downwardly. This will apply force against the lower set of slips in the upper snubbing member and the upper set of slips in the lower snubbing members and enable the operator to test the holding capacity of these slips. Obviously, if slippage of any set of slips occurs in testing, this will become readily apparent to the operator and remedial action can be taken.

The structural arrangement of the snubbing device wherein a plurality of cylinders 36, preferably at least three, are disposed in symmetrically spaced arrangement between the base member and the lower snubbing member, provides a relatively rigid self-supporting structure when attached to the well head fitting. This enables the mounting of a working platform 130 surrounding the device at a point below the upper snubbing member, as by bolting it to the top of *the* lower snubbing member. A plurality of circumferentially spaced angle braces 131 extend between the platform and base plate 20 and are suitably secured thereto to effectively support the platform for use by personnel handling the pipe being moved in or out of the well. The platform is ordinarily constructed in sections for easy installation and removal.

The self-supporting character of the snubbing device thus eliminates the need of a separate or special rig or derrick as is needed with more conventional devices used for the same purpose and provides a highly compact, efficient, easily transportable structure.

It will be understood that various changes and modifications may be made in the details of the illustrative embodiment within the scope of the appended claims, but without departing from the spirit of this invention. For example, rotation of pipe T may be performed by attaching any suitable drive mechanism directly to pipe T instead of employing the fixed arrangement of motor 89 as illustrated. Also stripper 26 may be mounted in a swivel support in base plate 20 so that it, too, may rotate with pipe T when the latter is rotated.

What I claim and desire to secure by Letters Patent is:

1. A pipe snubber, comprising, a base member removably attachable to a tubular well head fitting through which a pipe string is to be moved, a stationary snubbing member mounted on the base member in vertically spaced relation thereto, a plurality of vertically disposed angularly spaced cylinders fixedly mounted between the base member and said stationary snubbing member, pistons reciprocable in the cylinders and having piston rods extending through and above the stationary snubbing member, means for directing pressure fluid into said cylinders for reciprocating said pistons, a movable snubbing member secured to the upper ends of the piston rods for reciprocation therewith, said base member and both said snubbing members having coaxial bores aligned with the bore of the well head fitting, separate sets of *radially gripping* pipe-gripping elements mounted in the upper and lower ends of the bores of each of the snubbing members for reciprocative radial movement in said bores, fluid pressure-actuated means in each of the snubbing members connected to the respective sets of pipe-gripping elements therein for moving both sets of the latter simultaneously into and out of *radial* pipe-gripping position, and means for selectively supplying fluid pressure fluid to said fluid pressure-actuated means in said snubbing members.

2. A pipe snubber, comprising, a base member removably attachable to a tubular well head fitting through which a pipe string is to be moved, a stationary snubbing member mounted on the base member in vertically spaced relation thereto, a plurality of vertically disposed angularly spaced cylinders fixedly mounted between the base member and said stationary snubbing member, pistons reciprocable in the cylinders and having piston rods extending through and above the stationary snubbing member, means for directing pressure fluid into said cylinders for reciprocating said pistons, a movable snubbing member secured to the upper ends of the piston rods for reciprocation therewith, said base member and both said snubbing members having coaxial bores aligned with the bore of the well head fitting, separate sets of *radially gripping* pipe-gripping elements mounted in the upper and lower ends of the bores of each of the snubbing members for reciprocative radial movement in said bores, fluid pressure-actuated means in each of the snubbing members connected to the respective sets of pipe-gripping elements therein for moving both sets of the latter simultaneously into and out of *radial* pipe-gripping position, means for selectively supplying pressure fluid to said fluid pressure-actuated means in said snubbing members whereby to selectively secure one of said snubbing members to said pipe string and to release the other snubbing member from the pipe string, and means mounting the sets of pipe-gripping elements in said movable snubbing member for rotation relative thereto.

3. A pipe snubber, comprising, a base member removably attachable to a tubular well head fitting through which a pipe string is to be moved, a stationary snubbing member mounted on the base member in vertically spaced relation thereto, a plurality of vertically disposed angularly spaced cylinders fixedly mounted between the base member and said stationary snubbing member, pistons reciprocable in the cylinders and having piston rods extending through and above the stationary snubbing member, means for directing pressure fluid into said cylinders for reciprocating said pistons, a movable snubbing member secured to the upper ends of the piston rods for reciprocation therewith, said base member and both said snubbing members having coaxial bores aligned with the bore of the well head fitting, separate sets of *radially gripping* pipe-gripping elements mounted in the upper and lower ends of the bores of each of the snubbing members for reciprocative radial movement in said bores, fluid pressure-actuated means in each of the snubbing members connected to the respective sets of pipe-gripping elements therein for moving both sets of the latter simultaneously into and out of *radial* pipe-gripping position, means for selectively supplying pressure fluid to said fluid pressure-actuated means in said snubbing members whereby to selectively secure one of said snubbing members to a pipe string being moved through the well head fitting and to release the other snubbing member from the pipe string, means mounting the sets of pipe-gripping elements in said movable snubbing member for rotation relative thereto, and drive means mounted on the movable snubbing member for rotating the last-mentioned set of pipe-gripping elements.

4. A pipe snubber, comprising, a base member removably attachable to a tubular well head fitting through which a pipe string is to be moved, a stationary snubbing member mounted on the base member in vertically spaced relation thereto, a plurality of vertically disposed angularly spaced cylinders fixedly mounted between the base member and said stationary snubbing member, pistons reciprocable in the cylinders and having piston rods extending through and above the stationary snubbing member, means for directing pressure fluid into said cylinders for reciprocating said pistons, a movable snubbing member secured to the upper ends of the piston rods for reciprocation therewith, said base member and both said snubbing members having coaxial bores aligned with the bore of the well head fitting, separate sets of *radially gripping* pipe-gripping elements mounted in the upper and lower ends of the bores of each of the snubbing members for reciprocative radial movement in said bores, fluid pressure-actuated means in each of the snubbing members connected to the respective sets of pipe-gripping elements therein for moving both sets of the latter simultaneously into and out of *radial* pipe-gripping position, and means for selectively supplying pressure fluid to said fluid pressure-actuated means in said snubbing members whereby to selectively move both the sets of pipe-gripping elements on one of said snubbing members into pipe-gripping position and moving both the sets of pipe-gripping elements on the other member to pipe-releasing position.

5. A pipe snubber, comprising, a base member removably attachable to a tubular well head fitting through which a pipe string is to be moved, a stationary snubbing member mounted on the base member in vertically spaced relation thereto, a plurality of vertically disposed angularly spaced cylinders fixedly mounted between the base member and said stationary snubbing member, pistons reciprocable in the cylinders and having piston rods extending through and above the stationary snubbing member, means for directing pressure fluid into said cylinders for reciprocating said pistons, a movable snubbing member secured to the upper ends of the piston rods for reciprocation therewith, said base member and both said snubbing members having coaxial bores aligned with the bore of the well head fitting, separate sets of pipe-gripping wedges mounted in the upper and lower ends of the bores of each of the snubbing members for reciprocative radial movement in said bores, the wedges having portions projecting outwardly from said ends of the bores, fluid pressure-actuated means in each of the snubbing members connected to both sets of the respective pipe-gripping wedges for simultaneously moving the latter into and out of pipe-gripping position, and means for selectively supplying pressure fluid to said fluid pressure-actuated means in said snubbing members, said fluid pressure-actuated means including an annular hanger member connected to the outwardly projecting portions of each set of wedges, and separate fluid pressure-actuated piston means reciprocably mounted in each of the snubbing members and operably connected to the respective hanger members therein.

6. A pipe snubber, comprising a base member removably attachable to a tubular well head fitting through which a pipe string is to be moved, a stationary snubbing member mounted on the base member in vertically spaced relation thereto, a plurality of vertically disposed angularly spaced cylinders fixedly mounted between the base member and said stationary snubbing member, pistons reciprocable in the cylinders and having piston rods extending through and above the stationary snubbing member, means for directing pressure fluid into said cylinders for reciprocating said pistons, a movable snubbing member secured to the upper ends of the piston rods for reciprocation therewith, said base member and both said snubbing members having coaxial bores aligned with the bore of the well head fitting, an annular resilient sealing element positioned in the bore of the base member for sealing about a pipe string moving therethrough, separate sets of pipe-gripping wedges mounted in the upper and lower ends of the bores of each of the snubbing members for reciprocative radial movement in said bores, the wedges having portions projecting outwardly from said ends of the bores, fluid pressure-actuated means in each of the snubbing members connected to both sets of the respective pipe-gripping wedges for simultaneously moving the latter into and out of pipe-gripping position, means for selectively supplying pressure fluid to said fluid pressure-actuated means in said snubbing members, means mounting the sets of pipe-gripping wedges in said movable snubbing member for rotation relative thereto, and drive means mounted on the movable snubbing member for rotating the last-mentioned set of pipe-gripping wedges, said fluid pressure-actuated means including an annular hanger member connected to the outwardly projecting portions of each set of wedges, and separate fluid pressure-actuated piston means reciprocably mounted in each of the snubbing members and operably connected to the respective hanger members therein.

7. In a pipe snubber including a stationary lower snubbing member, a movable upper snubbing member vertically reciprocable relative to the lower snubbing member, and fluid pressure means for reciprocating said upper snubbing member, each of said snubbing members comprising, a body having a through bore to receive a pipe, said bore comprising oppositely inwardly converging frusto-conical opposite end portions, separate sets of pipe-gripping wedges mounted in said end portions for reciprocative radial movement therein into and out of pipe-gripping positions, a pressure cylinder in the body, a pair of oppositely movable pistons slidably mounted in said cylinder and operably secured to the respective sets of wedges to move said wedges in accordance with the respective piston movements, and means for alternatively supplying pressure fluid selectively to said cylinder (a) at a point between said pistons to urge said pistons apart, and (b) at points in the opposite ends of said cylinder to urge the pistons toward each other, whereby to simultaneously move both said sets of wedges selectively into or out of pipe-gripping position.

8. In a pipe snubber, a snubbing member comprising, a body having a through bore to receive a pipe, said bore comprising oppositely inwardly converging frusto-conical opposite end portions, separate sets of pipe-gripping wedges mounted in said end portions for reciprocative radial movement therein into and out of pipe-gripping positions, a pressure cylinder in the body, a pair of oppositely movable pistons slidable in said cylinder, means operably securing each piston to one of said sets of wedges to move said wedges in accordance with the respective piston movements, a first pressure fluid duct communicating with said cylinder at a point between the pistons, and a second pressure fluid duct communicating with both end portions of said cylinder outside said pistons.

*9. In a pipe snubber, including a stationary lower snubbing member, a movable upper snubbing member vertically reciprocable relative to the lower snubbing member, and fluid pressure means for reciprocating said upper snubbing member, each of said snubbing members comprising, a body having a through bore to receive a pipe, separate sets of radially gripping pipe-gripping wedges mounted in the opposite end portions of each of said bores for reciprocative longitudinal and radial movement therein into and out of pipe-gripping positions, and means including fluid pressure-actuated means in each of said snubbing members operatively connected to the sets of pipe-gripping wedges in each snubbing member for moving both sets of wedges therein simultaneously into and out of radial pipe-gripping*

References Cited by the Examiner

The following references, cited by the Examiner, are of record in the patented file of this patent or the original patent.

UNITED STATES PATENTS

| | | | |
|---|---|---|---|
| 1,121,718 | 12/14 | Derby et al. | 254—31 |
| 1,241,430 | 9/17 | Osborne | 254—30 |
| 1,895,132 | 1/33 | Minor. | |
| 2,126,933 | 8/38 | Stone et al. | 24—263.5 |
| 2,231,923 | 2/41 | Koen. | |
| 2,352,370 | 6/44 | Carruthers | 61—46.5 |
| 2,555,145 | 5/51 | McKinney | 254—29 |
| 2,830,788 | 4/58 | Bentley et al. | 254—106 X |
| 2,939,291 | 6/60 | Schwman et al. | 61—46.5 X |
| 2,944,403 | 7/60 | Smith | 61—46.5 |
| 3,076,245 | 2/63 | Acker. | |

DONLEY J. STOCKING, *Primary Examiner.*